A. H. BEISNER.
STRAW CONVEYER AND SPREADER.
APPLICATION FILED MAY 9, 1917.
1,256,196.
Patented Feb. 12, 1918.
3 SHEETS—SHEET 3.
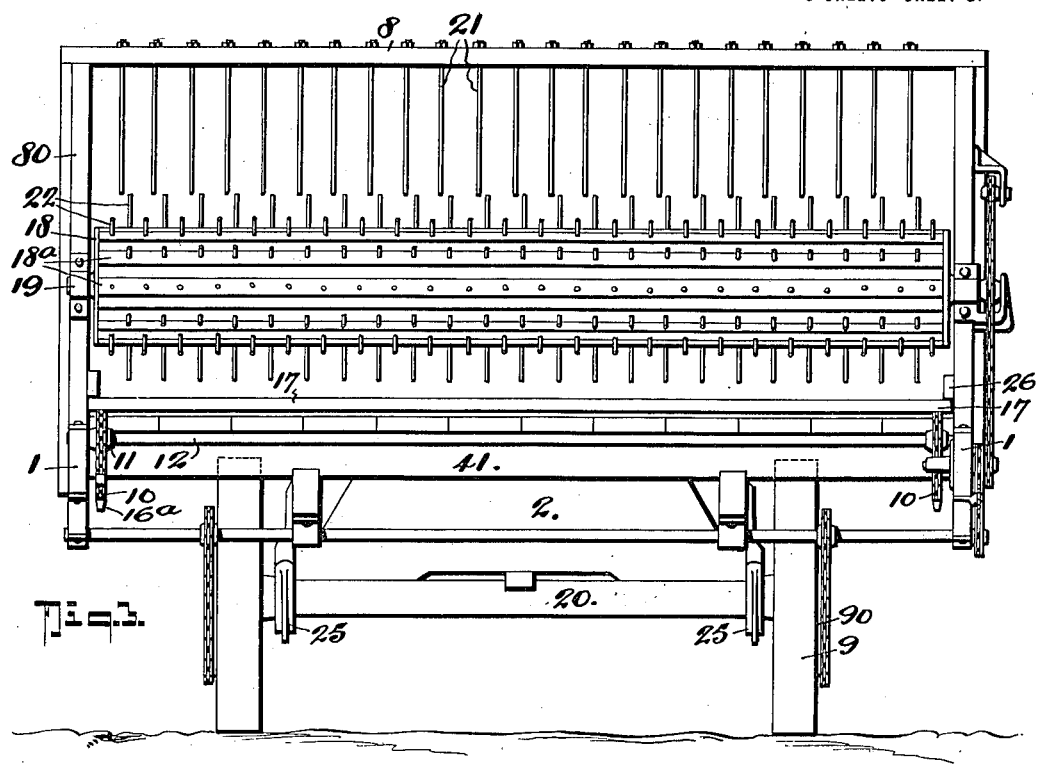
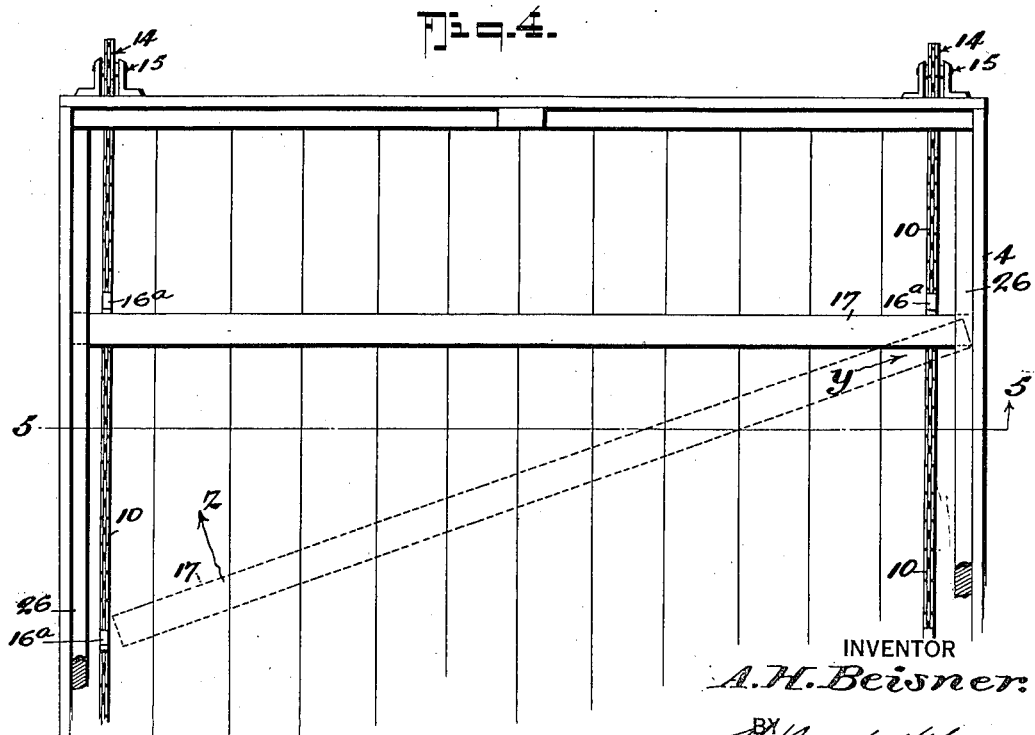
INVENTOR
A. H. Beisner.
BY
ATTORNEY

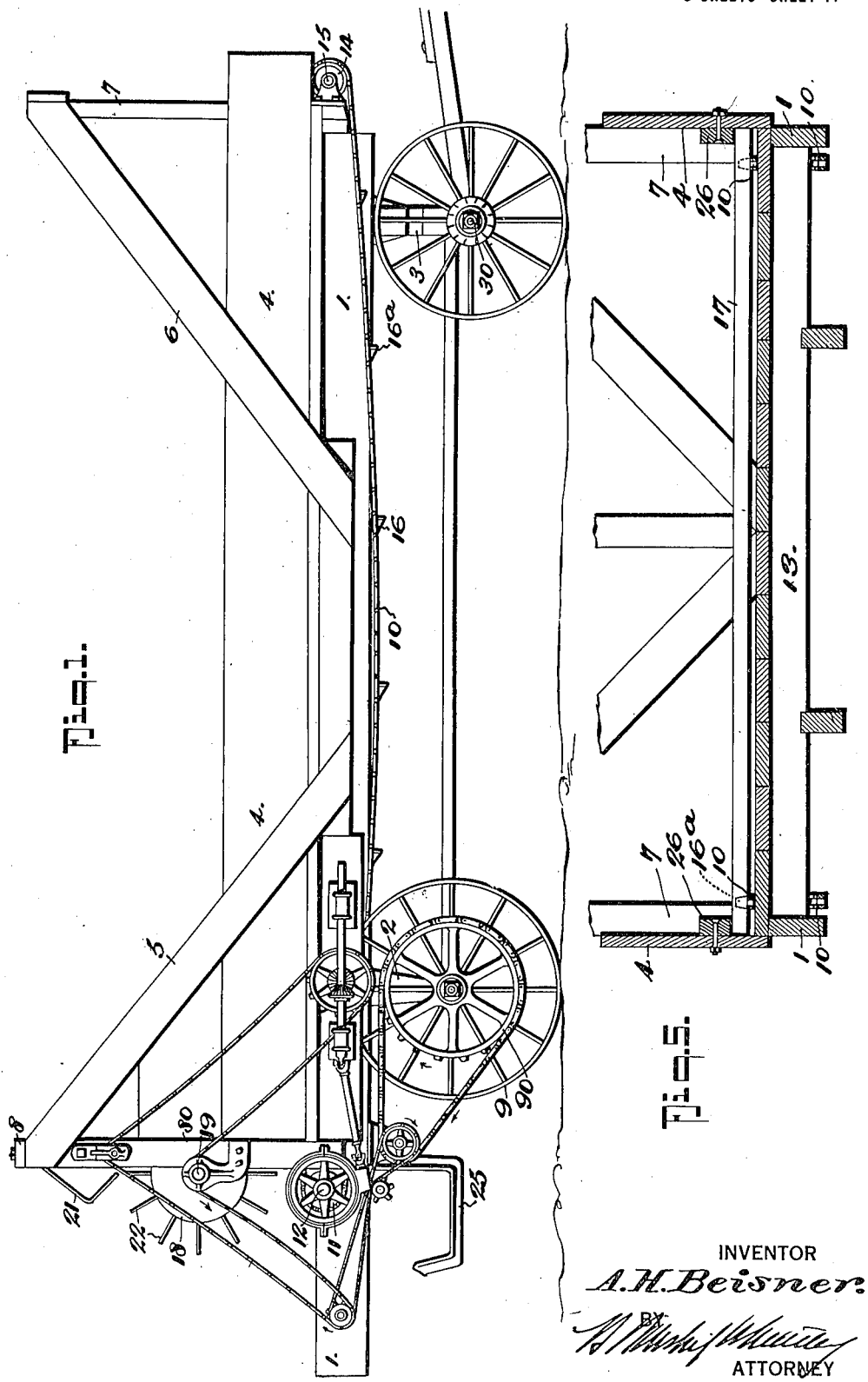

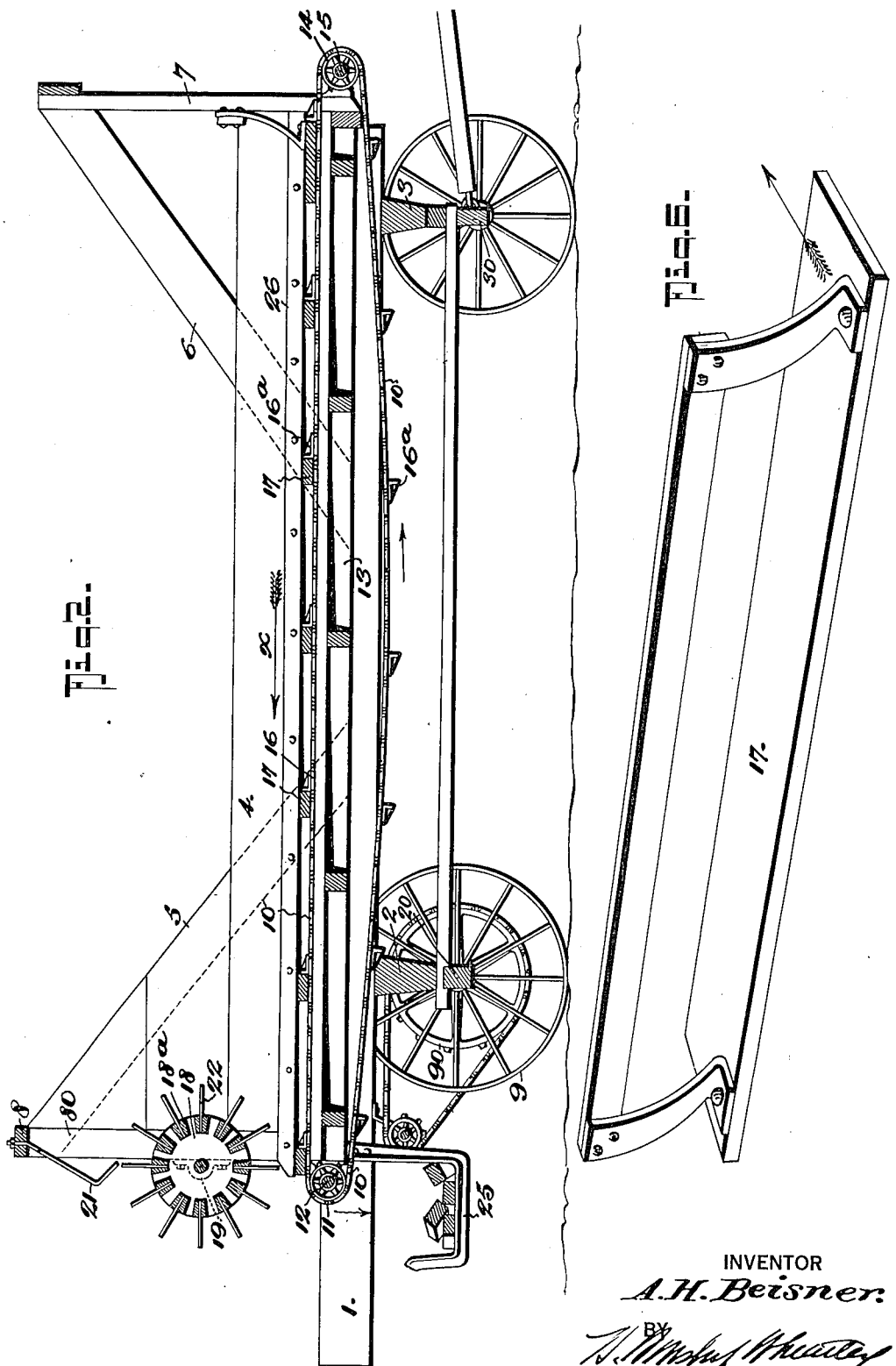

UNITED STATES PATENT OFFICE.

AUGUST H. BEISNER, OF HEBRON, NEBRASKA.

STRAW CONVEYER AND SPREADER.

1,256,196.   Specification of Letters Patent.   Patented Feb. 12, 1918.

Application filed May 9, 1917. Serial No. 167,571.

*To all whom it may concern:*

Be it known that I, AUGUST H. BEISNER, a citizen of the United States, residing at Hebron, in the county of Thayer and State of Nebraska, have invented a new and Improved Straw Conveyer and Spreader, of which the following is a specification.

My invention, which generally has reference to improvements in that type of machines adapted for conveying and spreading hay, manure or other fertilizer, in which the material is constantly moved toward the discharging or rear end of the machine for being engaged by a beater or distributing wheel from which the material is delivered and spread over the ground.

My invention primarily has for its object to provide a simple and inexpensive construction of an endless apron carrier adapted for being readily applied to a common hay rack and which includes a peculiar arrangement of slats adapted for being loosely mounted, instead of being fixedly attached to the endless chains, as is usually the case, and which, after they have served their purpose of dragging the load toward the rotary beater, automatically disconnect from the endless chain in condition for being taken up and carried to the front end of the wagon to be again connected with the chains in position for further use.

Furthermore, my invention embodies in its more complete make-up, a pusher device that coöperates with the cross slats and which serves to constantly force the material toward the rear end of the machine and which with its connected cross slats also separates from the endless conveyer chains, after passing to the rotary beater.

With other objects in view that will hereinafter be referred to, my invention is in the nature of an improved straw conveyer and spreader that embodies the peculiar features of construction and novel combination of parts, all of which will be described in detail, specifically pointed out in the appended claims and illustrated in the accompanying drawings, in which:

Figure 1 is a side elevation of my improved straw conveyer and spreading machine, the parts being in the operative position.

Fig. 2 is a longitudinal section thereof.

Fig. 3 is a rear elevation of my machine.

Fig. 4 is a top plan of the front of the vehicle showing the manner in which the cross planks are inserted.

Fig. 5 is a detail section taken on the line 5—5 on Fig. 4.

Fig. 6 is a detail perspective of the final pushing member.

In carrying out my invention, my improved mechanism is applied to and combined with an ordinary form of farmer's hay rack or wagon, so much of which is shown in the drawings as is necessary to illustrate the practical application of my said invention.

In the drawing, 1—1 designate the usual longitudinal side beams of the wagon supported by cross members which in turn rest on the front and rear axles in the usual manner.

4 designates the side timbers of the rack, 5 and 6 the usual diagonal braces at the front and rear ends, 7 the front standards and 8 a cross timber or head that connects the tops of the rear standards 80, as shown.

9—9 are the rear wagon wheels, to each of which is fixedly attached a power sprocket wheel 90, from which power is transmitted to the operating parts in the manner hereinafter mentioned.

A pair of endless chains 10—10, one on each side of the wagon, pass over chain wheels 11—11 mounted on a cross shaft 12 located at the rear edge of the wagon bed 13 and over similar chain wheels 14 mounted on a cross shaft 15 located at the front edge of the said wagon bed, as is best indicated in Fig. 2.

The chains 10 are provided with special links 16 having projecting lugs 16ª and the said special links are located two feet more or less apart along the full length of the said chains, the lug links on one chain being directly opposite the similar links on the other chain. 17 designates timbers, in practice 2″ by 4″ by 7′—½″, one of which is placed transversely over the wagon bed in front of each set of link lugs 16ª, as is clearly shown in Fig. 2, by reference to which it will be also seen that, when power is applied to cause the chains 10 to move backward, see arrow *x*, the timbers 17 form pusher slats that shove the manure or straw toward the spreading drum or beater 18 located over the rear end of the wagon bed at a suitable height above the cross shaft 12.

The beater 18 is journaled in bearings 19 on the rear edge of the rack standards 80—80 and the said beater coöperates with spring rake teeth 21 secured to and pendent from the cross bar 8, see Fig. 2, and the lower ends 21 of the rake teeth are bent inwardly and located just high enough over the rotary beater 18 to clear the picker fingers 22 that project from the longitudinal members 18ª of the beater 18, as shown.

In straw or manure spreaders having endless apron conveyers, pusher or follower devices are sometimes used that coöperate with the apron for preventing the straw or manure dropping over the inner end of the apron, when the slatted apron forms the bottom of the wagon and for working or pushing the manure toward the beater drum.

In my construction of manure spreader, I form the pusher or follower device in the manner best shown in Figs. 2 and 6, by reference to which it will be seen that the said pusher device consists of a base board or wide slat 17, preferably a 1″ by 12″ board, and a pusher member comprising cross bars 24ª and end uprights 24, preferably in the nature of stout spring metal members that are curved on such an arc so that the said members accommodate themselves to the radius of the radial fingers 22 of the beater 18 when the said pusher reaches the limit of the projected position, as indicated in dotted lines on Fig. 2.

In practice, the board 17 of the pusher or follower device is placed transversely of the opposite chains to be engaged by the chain lug 16ª, whereby the said device is carried forwardly as the chain wheels 11—11 impart the required motion to the endless chain carrier.

The weight of the load on the cross slat or board 17 holds the pusher or follower device in proper operative position, and the said cross timber 17 has its ends held down by engaging side guides 26 on the wagon bed as presently more fully explained.

By forming the pusher or follower device, as shown and described, when it has traveled up to the beater as indicated in dotted lines on Fig. 2, it can be readily lifted up off the chains and out of the side guides 26 (by turning the board 17 at an angle to the said guide) and readily carried back to the front end of the wagon and replaced on the conveyer chains and in engagement with the guides 26 to operate as before.

A pair of substantially U-shaped catcher hangers 25—25 are attached to and are pendent from the rear cross beam 41 and the wagon bed, it being understood that the said timbers 17 are lifted out of the hangers and are returned and engaged with the pusher fingers on the chains for repeating their manure pushing and conveying operations.

To hold the chains to a proper operative condition while passing over the wagon bed, guides 26—26 in the nature of 1″ by 2″ board strips are attached to the side bars of the wagon at a proper height from the rack follower or bottom, as is best shown in Fig. 5, which also shows the said guides 26—26 as extended under the beater or cylinder to avoid the cylinder teeth 22 coming into contact with the slats 17.

The slats 17 are readily restored to the operative position, at the front end of the wagon, by first shoving one end under the guide 26 at one side, see arrow $y$, in front of a chain lug 16ª at that side and swinging the other end back in the direction of arrow $z$, see Fig. 4 and then slipping the free end of the slats 17 under the guide 26 at the adjacent side until the slat engages a lug 16ª on the chain at that side.

What I claim is:

1. In a straw conveyer and spreader, the combination with the wagon box having a substantially closed bottom; means for conveying the load within the box toward the discharge end of the same, said conveying means comprising an endless chain apron having pusher elements, pusher slats loosely supported across the chain and coöperative with the pusher elements and devices for holding the slats down against the apron as they convey the load toward the discharge end of the box.

2. In a straw conveyer and spreader, the combination with the wagon box having a substantially closed bottom; means for conveying the load within the box toward the discharge end of the same, said conveying means comprising an endless chain apron having pusher elements, pusher slats loosely supported across the chain and coöperative with the pusher elements and devices for holding the slats down against the apron as they convey the load toward the discharge end of the box, and catcher brackets at the end of the wagon box into which the slats are dropped by the apron after passing through the discharge end of the box.

AUGUST H. BEISNER.